United States Patent [19]

Lyberg

[11] Patent Number: 5,664,050
[45] Date of Patent: Sep. 2, 1997

[54] PROCESS FOR EVALUATING SPEECH QUALITY IN SPEECH SYNTHESIS

[75] Inventor: Bertil Lyberg, Vagnhärad, Sweden

[73] Assignee: Telia AB, Farsta, Sweden

[21] Appl. No.: 622,039

[22] Filed: Mar. 21, 1996

Related U.S. Application Data

[63] Continuation of Ser. No. 250,685, May 27, 1994, abandoned.

[30] Foreign Application Priority Data

Jun. 2, 1993 [SE] Sweden ............... 9301886

[51] Int. Cl.$^6$ ................................ G10L 5/06
[52] U.S. Cl. ............... 704/251; 704/236; 704/258
[58] Field of Search ...................... 395/2.4, 2.45, 395/2.53, 2.55, 2.6, 2.67

[56] References Cited

U.S. PATENT DOCUMENTS

| | | | |
|---|---|---|---|
| 4,692,941 | 9/1987 | Jacks et al. | 381/52 |
| 4,860,360 | 8/1989 | Boggs | 395/2.45 |
| 5,127,055 | 6/1992 | Larkey | 381/43 |
| 5,359,695 | 10/1994 | Ohora et al. | 395/2.85 |

FOREIGN PATENT DOCUMENTS 2 258 936  2/1993  United Kingdom.

*Primary Examiner*—Kee M. Tung
*Attorney, Agent, or Firm*—Oblon, Spivak, McClelland, Maier & Neustadt, P.C.

[57] ABSTRACT

The present invention relates to a process for evaluating speech quality in speech synthesizers with the aid of a speech recognition system. The recognition system is programmed using a number of persons. It then receives synthetic or natural speech from speech synthesizers or persons respectively, displaying differing speech quality. The speech recognition system determines a level of recognition for each received speech quality. In order to evaluate the speech quality in a speech synthesizer, speech is received from the synthesizer by the speech recognition system, is allocated a level of recognition and is ranked in comparison to the levels of recognition for previously received speech.

4 Claims, 1 Drawing Sheet

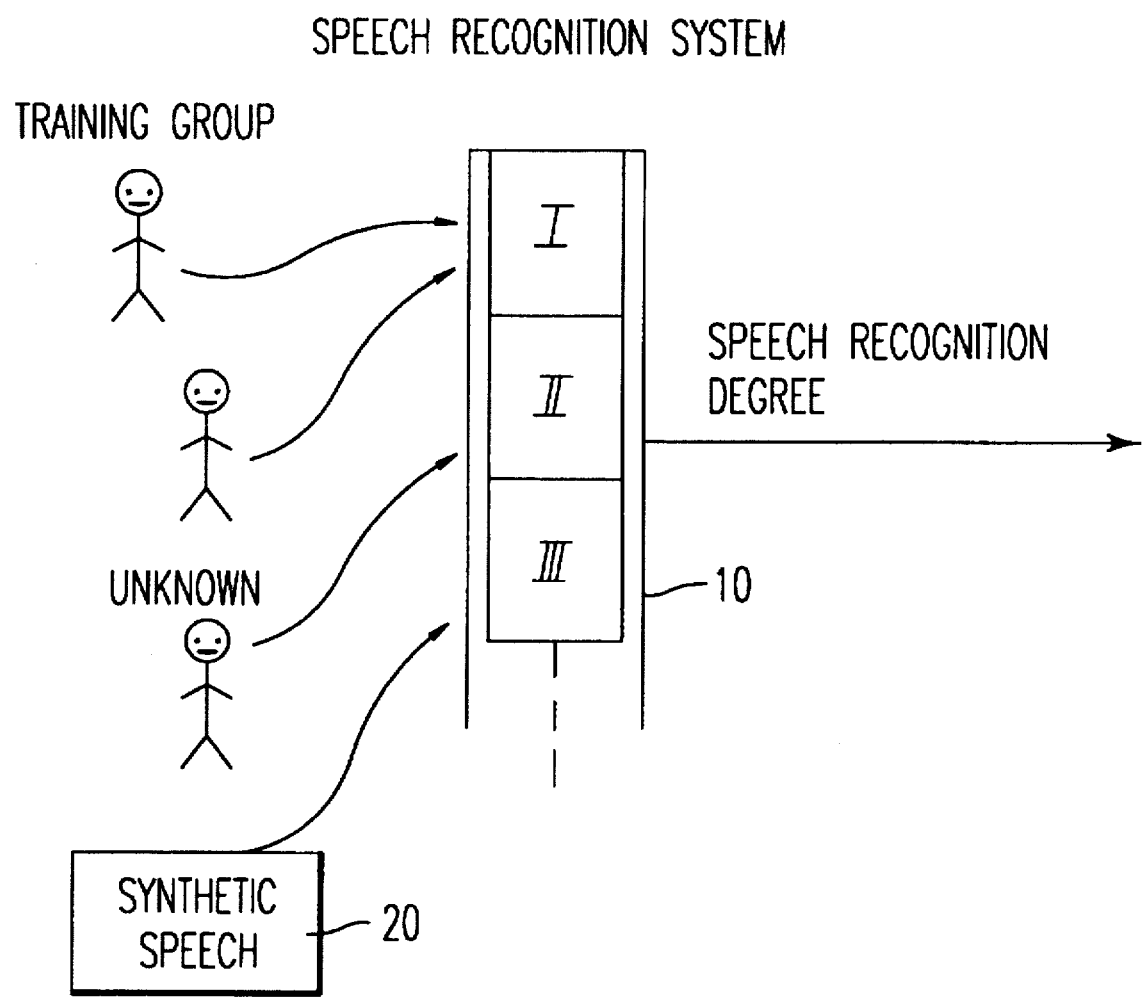

PROCESS FOR EVALUATING SPEECH QUALITY IN SPEECH SYNTHESIS

This application is a Continuation of application Ser. No. 08/250,685, filed on May 27, 1994, now abandoned.

FIELD OF THE INVENTION

The present invention relates to a process for evaluating speech quality in speech synthesis. More specifically, the invention is intended for use in equipment which is capable of receiving and analyzing speech messages, especially from speech synthesizers, i.e. text-to-speech converters. With the aid of the invention, the level of recognition of received speech in a speech recognition system can be ranked in terms of quality.

PRIOR ART

Speech recognition and text-to-speech conversion are techniques which are known per se.

U.S. Pat. No. 5,127,055 relates to speech recognition. A large number of references, representing vocal expression, are stored. Each reference has an associated quality value representing the effectiveness with which an incoming vocal expression is recognized. The user can make corrections, which represent the accuracy in the speech recognition. The quality values are updated.

U.S. Pat. No. 4,692,941 describes a known technique for text-to-speech conversion.

The present invention solves, in a new way, the problem of analyzing speech quality in a speech synthesizer.

SUMMARY OF THE INVENTION

The present invention thus provides a process for analyzing speech quality in speech synthesis. According to the invention, a speech recognition system is programmed using a number of persons. The speech recognition system then receives synthetic or natural speech from speech synthesizers and persons respectively, displaying differing speech quality, and determines a level of recognition for each received speech quality. The speech quality for the speech synthesizer to be evaluated is determined by receiving speech from the speech synthesizer, determining its level of recognition and ranking the synthesizer in comparison with the levels of recognition for previously received speech.

The invention is defined in the following patent claims.

BRIEF DESCRIPTION OF THE DRAWINGS

A more complete appreciation of the present invention, and many of the attendant advantages thereof, will be readily obtained as the same becomes understood by reference to the following detailed description when considered in connection with the accompanying drawing, wherein:

FIG. 1 shows a detailed diagram of the system of the present invention.

DETAILED DESCRIPTION OF A PREFERRED EMBODIMENT OF THE INVENTION

The invention is intended for application in speech recognition systems which are to receive and analyze speech messages, especially from speech synthesizers.

With reference to FIG. 1, a speech recognition system 10 must first be programmed to be able to recognize speech. Speech from a number of persons (training group) is used to teach the speech recognition system to recognize speech.

The level of recognition for the speech from the programming group is consequently 100%. When the speech recognition system 10 is then used with general speech (unknown), it is able to understand the received speech to a very high degree.

In order to assign a quality measure to received speech, the speech recognition system must receive speech from persons and speech synthesizers other than those which are used to program the speech recognition system. The speech quality from speech from different sources can be allocated certain speech quality values in dependence upon the associated level of recognition. This collective material can then be used to evaluate the speech quality in other speech synthesizers, for example.

In order to evaluate the speech quality in a speech synthesizer 20, speech is sent from the synthesizer to the speech recognition system 10. This analyzes the speech and allocates a level of recognition to the received speech. This level of recognition can then be compared with speech previously received by the speech recognition system and ranked. A verdict can thus directly be given on the speech quality in the synthesizer in question; it is better than certain previously tested synthesizers and persons, but worse than others.

The scope of the invention is limited only by the following patent claims.

I claim:

1. A process for evaluating speech quality in synthetic speech generated from a speech synthesizer in a speech recognition system programmed using speech from a training group, comprising the steps of:

receiving synthetic speech from at least one speech synthesizer;

receiving natural speech from a plurality of human sources;

determining a level of recognition for each received speech from the at least one speech synthesizer and plurality of human sources; and evaluating the synthetic speech from the at least one speech synthesizer by allocating a level of recognition and a rank of the synthetic speech from the at least one speech synthesizer in comparison to the natural speech from the plurality of human sources.

2. A system for evaluating speech quality in synthetic speech generated from a speech synthesizer comprising:

at least one speech synthesizer for generating synthetic speech;

a speech recognition system programmed using speech from a training group and for receiving the synthetic speech from the at least one speech synthesizer and natural speech from a plurality of human sources;

wherein a level of recognition for each received speech from the at least one speech synthesizer and the plurality of human sources is determined; and wherein the synthetic speech from the at least one speech synthesizer is evaluated by allocating a level of recognition and a rank of the synthetic speech from the at least one speech synthesizer in comparison to the natural speech from the plurality of human sources.

3. A system for evaluating speech quality in synthetic speech generated from a speech synthesizer comprising:

at least one speech synthesizer for generating synthetic speech;

a speech recognition system programmed using speech from a training group of a first plurality of human sources and for receiving the synthetic speech from the at least one speech synthesizer and natural speech from a second plurality of human sources;

wherein a level of recognition for each received speech from the at least one speech synthesizer and the second plurality of human sources is determined; and wherein the synthetic speech from the at least one speech synthesizer is evaluated by allocating a level of recognition and a rank of the synthetic speech from the at least speech synthesizer in comparison to the natural speech from the second plurality of human sources.

4. The system according to claim 3, wherein the speech recognition system establishes a level of recognition of the training group of the first plurality of human sources at 100%.

* * * * *